United States Patent
Souza Carneiro et al.

(10) Patent No.: US 12,423,407 B1
(45) Date of Patent: Sep. 23, 2025

(54) SECURITY HARDENING OF A RENEWABLE ENERGY DEVICE SYSTEM

(71) Applicant: VESTAS WIND SYSTEMS A/S, Aarhus N (DK)

(72) Inventors: Rafael Angelo Souza Carneiro, Oporto (PT); Luis Miguel Teixeira, Vizela (PT); Jose Francisco Silva Pereira, Lousada (PT); Bruno Andre Lopes Ferreira, Rans (PT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 19/000,595

(22) Filed: Dec. 23, 2024

(30) Foreign Application Priority Data

Sep. 9, 2024 (EP) ..................... 24199151

(51) Int. Cl.
*G06F 21/50* (2013.01)
*G06F 21/00* (2013.01)

(52) U.S. Cl.
CPC .................... *G06F 21/50* (2013.01)

(58) Field of Classification Search
CPC .......... G06F 21/50; G06F 21/56; G06F 21/57; G06F 21/577; G06F 21/552; G06F 21/554; G06F 21/70; G06F 21/71
See application file for complete search history.

(56) References Cited

U.S. PATENT DOCUMENTS

| | | | |
|---|---|---|---|
| 2023/0199004 A1* | 6/2023 | Texada | H04L 63/1425 726/22 |
| 2023/0283521 A1 | 9/2023 | Berger et al. | |
| 2023/0370334 A1* | 11/2023 | Mannengal | H04L 43/04 |
| 2024/0020095 A1* | 1/2024 | Kadam | H04L 41/5051 |
| 2024/0283811 A1 | 8/2024 | Thompson | |

OTHER PUBLICATIONS

European Patent Office, extended European Search Report for Application 24199151.2-1206 dated Jun. 12, 2024.
Salman, Ahmed et al., "Position Paper: Leveraging Large Language Models for Cybersecurity Compliance", 2024 IEEE European Symposium on Security and Privacy Workshops (EuroS&PW), IEEE, Jul. 8, 2024 (Jul. 8, 2024), pp. 496-503.

* cited by examiner

*Primary Examiner* — Edward Zee
(74) *Attorney, Agent, or Firm* — Patterson + Sheridan, LLP; Gero G. McClellan

(57) ABSTRACT

A computer implemented method for security hardening of a renewable energy device system including: i) determining a target security standard for the system using a first model trained using a first machine learning process that predicts the target security standard from a security posture of the system. The method also includes ii) identifying one or more deviations in the security posture of the system from the target security standard, and iii) using a second model trained using a second machine learning process to recommend an action to perform on the system to move the security posture of the system toward the determined target security standard.

18 Claims, 3 Drawing Sheets

# SECURITY HARDENING OF A RENEWABLE ENERGY DEVICE SYSTEM

FIELD OF INVENTION

The present disclosure relates to computer implemented systems and methods for security hardening of renewable energy device systems, such as a Wind Power Plant Device.

BACKGROUND

The field of renewable energy has gained significant attention in recent years due to the increasing global demand for clean and sustainable energy sources which has led to an elevated risk of cyber threats. These threats can compromise the availability, integrity, and confidentiality of critical infrastructure, leading to potential disruptions in the generation and distribution of energy. Ensuring the cybersecurity compliance of renewable energy Operating Technology (OT) systems is increasingly important to safeguard their operation and protect against cyberattacks.

In the field of renewable energy, wind power plants (WPPs) are increasingly being considered critical infrastructure, and therefore WPP systems are valuable assets that need to be protected to ensure high availability, reliability, and safety of operation. Security breaches and cyber-attacks to WPPs, especially Industrial Control Systems, can result in significant financial losses, damage to reputation, and legal liabilities. Therefore, there is high motivation in organisations to ensure that their WPP systems are secure and comply with industry-standard security guidelines.

WPPs constructed at different points in time have varying levels of technology and may or may not be compliant with the latest regulations. Due to the varying levels of technology, updating the cybersecurity of different WPPs can be an arduous process. To update the cybersecurity of a WPP, the technology of the particular WPP has to be understood and compared to the most recent regulatory requirements. Once the weak areas have been identified and understood, the cybersecurity system either has to be updated or altogether replaced to make it compliant with the most recent security regulations.

Generally, the process by which the necessary technical and organizational measures are implemented to reduce the vulnerabilities of a system is known as system hardening. System hardening can be applied to an ICS device, an IT component (physical or virtual), OT devices, a network device, a software application, a database, an operating system, or any other computer-based infrastructure.

System hardening is performed according to particular standards which indicate a particular set of security controls that have to be deployed by certain systems. The hardening standards include:
  rules regarding the patching and updates on OS;
  physical security;
  data encryption;
  access control;
  system backup; and
  auditing and monitoring.

To perform a hardening of a system, compliance checks must be carried out to produce a thorough and detailed assessment of the target system, as well as an identification of the target system components that have to be improved. Without continuous and systematic auditing compliance checks, the security level of the systems decays over time with respect to the constantly evolving security standards and best practices.

System hardening is generally currently undertaken manually by deploying skilled Engineers onsite. These Engineers assess the WPPs, determine its current security posture and recommend a sequence of updates to improve the security posture. In a large and complicated system with multiple and distributed components, performing the above-mentioned compliance checks and managing the state of each component becomes a huge task.

An objective of the current disclosure is therefore to address at least one of the limitations outlined above.

SUMMARY OF THE DISCLOSURE

As described in the background section above, currently, system hardening of renewable energy device systems, such as devices systems associated with WPPs, is performed manually by deploying skilled Engineers on site. Systems have to comply with operational standards to ensure safety of operation, however the ad-hoc nature of manual updates can often lead to partial upgrades, and partial adherence to such standards. Furthermore, because renewable energy systems are increasingly considered critical infrastructure, upgrades are performed cautiously, with each upgrade or change being assessed to ensure there is no change in reliability, stability or safety of the system as a result. This results in highly stable systems, however, cautious manual updating in this manner means that sites are rarely upgraded from one security standard to another in one go, rather, it is an incremental process and the adherence (or lack thereof) to a particular standard must be assessed by the on-site Engineers when performing each upgrade.

It is an object of embodiments herein to provide improved security hardening of renewable energy systems such as WPP devices. Thus, according to a first aspect there is a computer implemented method for security hardening of a renewable energy device system. The method comprises: i) determining a target security standard for the system using a first model trained using a first machine learning process that predicts the target security standard from a security posture of the system; ii) identifying one or more deviations in the security posture of the system from the target security standard; and iii) using a second model trained using a second machine learning process to recommend an action to perform on the system to move the security posture of the system toward the determined target security standard.

Thus, in systems and methods herein, machine learning is used to first determine or identify a target security standard appropriate for the renewable energy system. This streamlines and standardises the previously manual process performed by the aforementioned on-site Engineers. Once the target security standard has been identified, deviations of the current security posture from the target security standard are determined and a second machine learning model is then used to determine an action to move the security posture of the renewable energy system toward the target standard. There is thus provided a fully automatable system for performing security hardening in a renewable energy system device, that can be used in a reliable way, even on critical infrastructure such as the WPPs described herein. The disclosure here addresses some of the disadvantages above by reducing the manual burden associated with the current use of on-site Engineers, while also ensuring reliability, continuity of service, and safety.

In some embodiments, steps ii) and iii) are repeated in an iterative manner to sequentially recommend a plurality of actions to perform on the system to move the security posture of the system toward to the determined target security standard. Incrementally performing updates in this manner enables the stability of each update to be assessed between updates, thus ensuring a reliable update process suitable for the critical nature of renewable energy systems.

In some embodiments, in each iteration, an instruction is sent to an agent on the device to cause the agent to implement the respective recommended action. Following the recommended action having been performed, the method then may comprise determining an updated security posture, and evaluating the respective recommended action in view of the updated security posture, and the target security standard. This review process ensures reliability, and continuity of critical renewable energy device systems.

In some embodiments, the second model is a reinforcement learning model, and the reward function of the reinforcement learning model gives: a positive reward for recommendations made by the reinforcement learning model that move the security posture toward the target security standard and/or that result in increased availability, reliability, and/or safety of operations of the renewable energy device system; and a negative reward for recommendations made by the reinforcement learning model that move the security posture away from the target security standard and/or result in decreased availability, reliability, and/or safety of operations of the renewable energy device system. This enables stable updates to be prioritised that not only move the security posture of the system toward the target security guideline, but do so in a way that is safe, reliable and does not degrade the availability or performance of the renewable energy system.

In some embodiments, the determined target security standard is selected from a plurality of candidate security standards and either: most closely matches the security posture of the system; or represents an upgrade to a most closely matching security standard to the security posture of the system.

In some embodiments, the recommended action comprises an instruction to apply one or more security controls to the device, wherein the security controls relate to: configuring a firewall, updating a software patch, disabling a service, disabling a port, enforcing or changing an access control on the system, isolating a sub-component of the system, escalating an alert to a central management system or adjusting a system configuration.

In some embodiments, the method further comprises: determining the security posture for the system from a hardware and/or software configuration of the system.

In some embodiments, the method further comprises: receiving one or more device profiles for the renewable energy device from an agent on the device; receiving one or more behaviour logs for the system from the agent on the device; processing the device profiles and system behaviour logs using natural language processing; and determining the security posture from the processed device profiles and processed system behaviour logs. The use of Natural Language Processing in this way enables human-readable reports and logs to be processed as part of a fully automatable system.

In some embodiments, the step of identifying one or more deviations comprises using natural language processing to convert the target security standard into one or more compliance requirements or patterns that can be compared to the security posture of the system.

In some embodiments, the step of identifying one or more deviations is performed by performing one or more: vulnerability scans, log analysis, and/or penetration tests to detect potential weaknesses in the system.

In some embodiments, the step of identifying one or more deviations is performed using a third model trained using a third machine learning process. The third model may be an anomaly detection model, such as an isolation forest, one-class SVM model, or Autoencoder.

In some embodiments, the method further comprises outputting a report. Such a report may comprise the security posture of the system; the hardware and/or software configuration of the system; one or more vulnerabilities detected in the system; one or more security controls applied to the device as a result of the recommendation; one or more further recommendations for further hardening; and/or a compliance score indicating the security posture of the system.

In some embodiments, the renewable energy device is a Wind Power Plant Device, such as an Industrial Control System, Network Device, or Internet of Things device associated with the Wind Power Plant Device.

According to a second aspect there is a computer node for security hardening of a renewable energy device system. The node comprises: a memory comprising instruction data representing a set of instructions and a processor configured to communicate with the memory and to execute the set of instructions. The set of instructions, when executed by the processor, cause the processor to: i) determine a target security standard for the system using a first model trained using a first machine learning process that predicts the target security standard from a security posture of the system; ii) identify one or more deviations in the security posture of the system from the target security standard; and iii) use a second model trained using a second machine learning process to recommend an action to perform on the system to move the security posture of the system toward the determined target security standard.

According to a third aspect there is a computer node as in the second aspect, wherein the instructions further cause the processor to perform the method of the first aspect.

According to a fourth aspect there is a computer program comprising instructions which, when executed on at least one processor cause the processor to carry out the method of the first aspect.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

The disclosure herein relates to autonomous security compliance systems and methods for actively verifying the security compliance of WPP and other renewable energy systems, based on industry-standard guidelines. The systems described herein are designed to assess, in an automated manner, the security posture of the target systems utilizing an AI and machine learning module. As described in detail below, systems herein can perform functions such as identifying the best benchmark to use as reference for compliance check, identifying vulnerabilities and discrepancies in the security configurations and remediating any identified points. The systems herein can further be configured to generate a report of the target system in scope, that, for example, summarizes the level of security compliance achieved and the gap of the system before and after being analysed and remediated against the benchmark.

The systems herein are designed to be scalable and can be used to assess the security compliance of a wide range of target systems, including servers, Industrial Control Systems, and network devices. The systems herein can be configured to support multiple security guidelines and can be customized to meet specific needs depending on customer/organization requirements.

The present disclosure therefore provides a powerful tool for proactive monitoring and improvement of a WPPs security compliance posture, thereby reducing the risk of security breaches and improving the overall security of WPP systems using a central management connected to local agent architecture.

Figure 1:
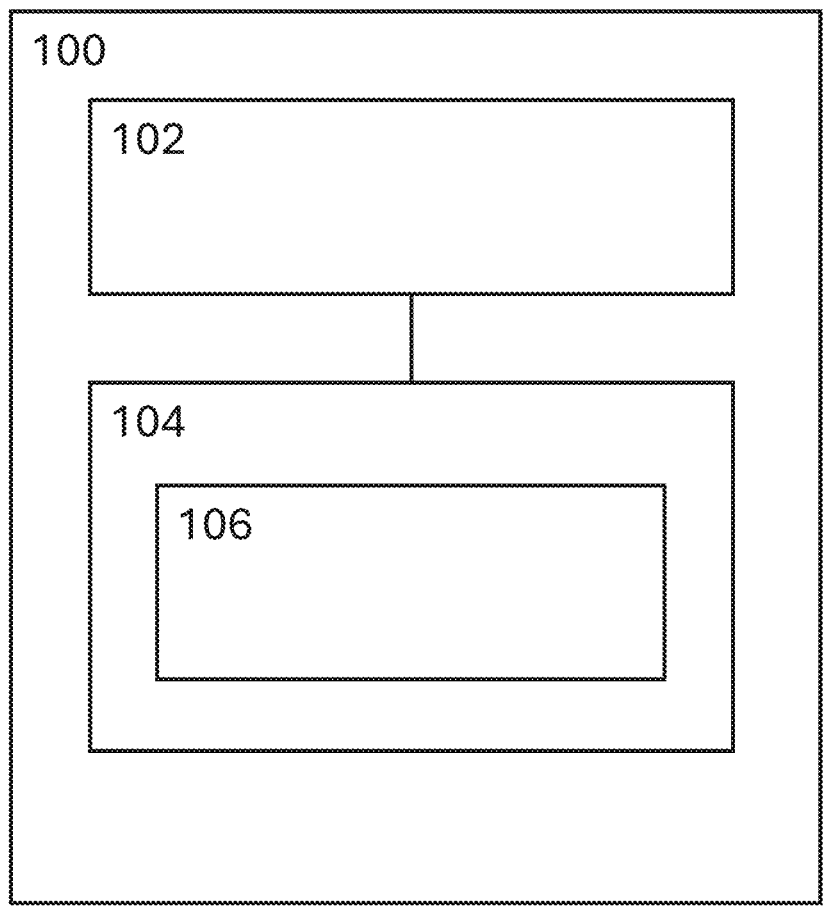
FIG. 1 shows an example computer node according to some embodiments herein.

FIG. 1 shows a node (e.g. a computing node that may otherwise be referred to herein as a computing "agent") that may form part of some embodiments herein. A node 100 may generally be configured (e.g. operative) to perform any of the methods and functions described herein, such as the method 200 described below. The node 100 comprises a processor 102, a memory 104 and set of instructions 106. The memory holds instruction data (e.g. such as compiled code) representing set of instructions 106. The processor may be configured to communicate with the memory and to execute the set of instructions. The set of instructions, when executed by the processor, may cause the processor to perform any of the methods herein, such as the method 200 described below.

Processor (e.g. processing circuitry or logic) 102 may be any type of processor, such as, for example, a central processing unit (CPU), a Graphics Processing Unit (GPU), a Neural Processing Unit (NPU), or any other type of processing unit. Processor 102 may comprise one or more sub-processors, processing units, multi-core processors or modules that are configured to work together in a distributed manner to control the node in the manner described herein.

The node 100 may comprise a memory 104. In some embodiments, the memory 104 of the node 100 can be configured to store program code or instructions 106 that can be executed by the processor 102 of the node 100 to perform the functionality described herein. The memory 104 of the node 100, may be configured to store any data or information referred to herein, such as for example, requests, resources, information, data, signals, or similar that are described herein. The processor 102 of the node 100 may be configured to control the memory 104 of the node 100 to store such information.

In some embodiments, the node 100 may be a virtual node, e.g. such as a virtual machine or any other containerised computer node. In such embodiments, the processor 102 and the memory 104 may be portions of larger processing and memory resources respectively.

It will be appreciated that a computing node 100 may comprise other components to those illustrated in FIG. 1. For example, node 100 may comprise a power supply (e.g. mains or battery power supply). The node 100 may further comprise a wireless transmitter and/or wireless receiver to communicate wirelessly with other computing nodes. In some embodiments, the node 100 may have a wired connection with which to communicate with other computing nodes. In some embodiments, the node 100 may further comprise a user input device such as a mouse, keyboard, or touch pad, for receiving input user data. In some embodiments, the node 100 may further comprise a display for displaying any of the data described herein, such as for example, any of the outputs (or intermediate data products) of any of the methods described herein.

In some embodiments, a node 100 may be comprised in OT of a WPPs, or other renewable energy system. In other examples, a node 100 may be comprised in one or more centralised nodes for use in controlling WPPs OT.

Figure 2:
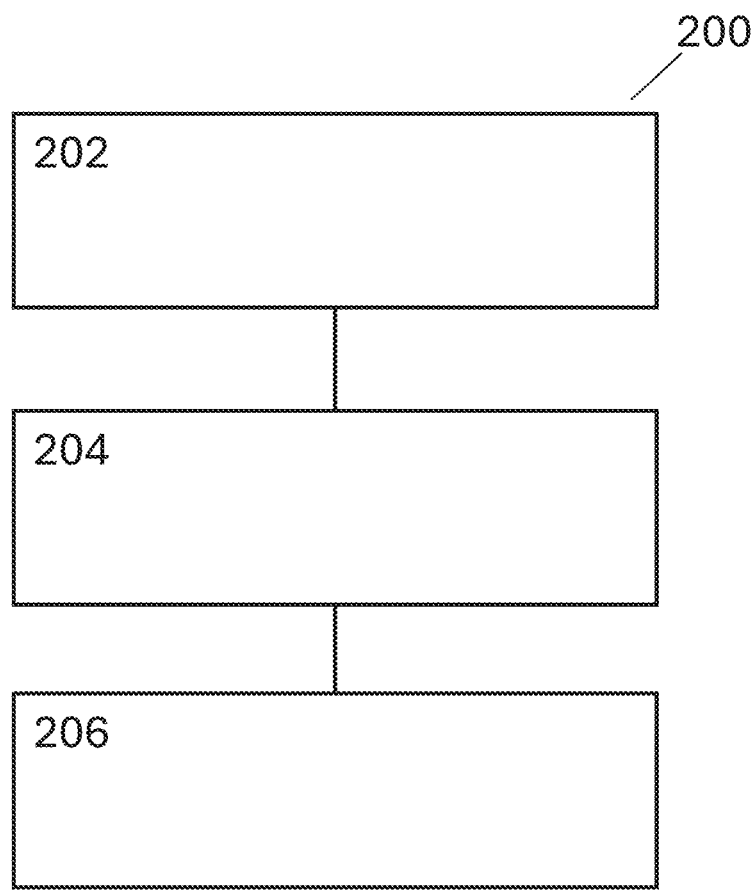
FIG. 2 shows an example method for security hardening of a renewable energy device system according to some embodiments herein.

FIG. 2 shows a computer implemented method 200 for security hardening of a renewable energy device system. In brief, the method 200 comprises in a first step determining 202 a target security standard for the system using a first model trained using a first machine learning process that predicts the target security standard from a security posture of the system. In a second step the method 200 then comprises identifying 204 one or more deviations in the security posture of the system from the target security standard. In a third step the method 200 comprises using 206 a second model trained using a second machine learning process to recommend an action to perform on the system to move the security posture of the system toward the determined target security standard.

In more detail, as used herein, security hardening refers to a process of reducing the vulnerability (or conversely increasing the security of), a computer system.

A renewable energy device system may be any type of renewable energy system, examples including but not limited to: on-shore, or off-shore Wind Power Plant Systems (WPPs), solar installations, and hydro-electric power systems. In some embodiments, the renewable energy device is a Wind Power Plant Device, such as an Industrial Control System, Network Device, or Internet of Things device associated with the Wind Power Plant Device.

In renewable energy device systems, there may be more than one computer node 100. For example, at a WPPS, there may be one or more on-site computer nodes 100 e.g. associated with the wind turbines at the site. Such on site nodes may each correspond to an individual wind turbine. The on-site computer nodes may then be connected (via a wired or wireless connection) to a centralised computer node 100 that collates information from and/or otherwise manages the respective onsite computer nodes.

It will be appreciated that this is merely an example however, and that many other configurations are equally possible. For example, onsite nodes may serve more than one wind turbine; the centralised node may also be onsite; and/or the centralised node may operate in the cloud. These are just some of the variations that the skilled person will appreciate are possible.

Turning back to the method 200, in step 202, as noted above, the method 200 comprises i) determining 202 a target security standard for the system using a first model trained using a first machine learning process that predicts the target security standard from a security posture of the system.

In step 202, the security posture of the system may be determined. The security posture of the system represents the current security state of the system. For example, The security posture of the system may be determined from information such as the hardware and/or software configuration of the system. For example, in step 202, one or more device profiles and/or behaviour logs for the renewable energy device may be received, for example from an agent (e.g. computer node) on the device. Other sources of data that can be used to determine the security posture include, but are not limited to, user access logs (logins, file access and the like), network traffic logs, system configuration changes, security events, security alerts, and/or any other information that might be used to determine the security posture of the system. Example data is given in Appendix I.

The aforementioned data sources (such as the device profiles and behaviour logs) may be analysed, for example, using natural language processing (NLP) in order to extract technical information on the hardware and/or software configuration of the device. The security posture may then be determined from the processed device profiles and processed system behaviour logs. Suitable open-source NLP models include BERT: "BERT: see paper entitled: "Pre-training of Deep Bidirectional Transformers for Language Understanding" by Devlin et al. (2019) available at arXiv: 1810.04805; and also Chat-GPT which is available via the OpenAI Platform.

It will be appreciated that the use of natural language processing in this manner is merely an example, however, and the security posture may equally be extracted in other ways, e.g. pattern recognition, OCR, via macros, or any other suitable method.

The target security standard may be an industry standard guideline (e.g. produced by a standardisation governing body), for example, such as an ISO guideline, NIST guideline, or CIS guideline. The target security standard may be obtained from a third-party provider. The target security guideline may be determined (e.g. predicted or selected) using a machine learning model. As noted above, traditionally, systems such as WPPs have been updated manually, and cautiously, in order to ensure continuity of operation and safety. As such, at any given time, a WPPs may only partially comply with a particular standard. Furthermore, the standard that has previously been used may not be stored on the WPPs' OT systems itself. Traditionally therefore, an Engineer would need to determine which standard the WPPs complied or partially complied with, before determining the next set of upgrades to be applied. In embodiments herein, this process is simplified and stratified through the use of machine learning methods. The first machine learning model may take the security posture of the renewable energy system as input and output the target security standard. The target security standard may represent the most closely matching standard to the current security posture. Alternatively, it may represent an upgrade to the current security posture, or an upgrade to the standard that most closely matches the current security posture of the system. The nature of the security standard that is output will depend on the manner in which the first machine learning model is trained (e.g. whether it is trained to output the most closely matching security standard, or an upgrade, or some other type of standard).

For example, the first machine learning model may be a supervised machine learning model, such as a neural network. Supervised ML models are trained on training data, each piece of training data comprising an example input to the model and the "correct" e.g. ground truth output for the respective example input. A training data set may be built up from the data collected by onsite engineers (e.g. real security posture information and real security guidelines for the security posture information as determined by an engineer), through labelled simulation-data, or via any other method.

The skilled person will be familiar with machine learning and methods of training a model using a machine learning process. But in brief, a model, which may otherwise be referred to as a machine learning model may comprise a set of rules or (mathematical) functions that can be used to perform a task related to data input to the model. Models may be taught to perform a wide variety of tasks on input data, examples including but not limited to: determining a label for the input data, performing a transformation on the input data, making a prediction or estimation of one or more parameter values based the input data, or producing any other type of information that might be determined from the input data.

As noted above, in supervised machine learning, the model learns from a set of training data comprising example inputs and corresponding ground-truth (e.g. "correct") outputs for the respective example inputs. Generally, the training process involves learning weight values of the model so as to tune the model to reproduce the ground truth output for the input data. Different machine learning processes are used to train different types of model, for example, machine learning processes such as back-propagation and gradient-descent can be used to train neural-network models.

The first model herein may generally be any type of machine learning model that can be trained to take input data related to the security posture which may be presented e.g. as a row of data (e.g. alpha-numeric strings) as input and output a target security standard. Examples include but are not limited to: neural network models, linear regression models and decision tree models.

In some examples, a decision tree may be used. Decision Trees may be the most direct as there are many ways in which devices and systems can affect each other and cause critical issues.

The machine learning models described herein can generally be set up and trained using open-source computer-code libraries. Examples of suitable open-source libraries include, but are not limited to: Scikit-learn, described in the paper: "Scikit-learn: Machine Learning in Python", Pedregosa et al., JMLR 12, pp. 2825-2830, 2011. Tensor-Flow, described in the paper by Martin Abadi et al. (2015): "TensorFlow: Large-scale machine learning on heterogeneous systems". Software available from tensorflow.org. Both of these libraries contain models that can be set up and used for the purposes herein. The advantages herein can generally be obtained using the default model set-up parameters and training procedures described therein, although it will be appreciated that other model configurations may yield further improvements, dependent on the design criteria.

Turning back to the method 200, in step 204, after determining an appropriate target security standard, one or more deviations in the (current) security posture of the system from the target security standard are identified. This may be performed in various different ways.

As an example, natural language processing can be used to convert the target security standard (which may be presented in the manner of a human-readable text-based manual, or document) into one or more compliance requirements or computer readable patterns that can be compared to the security posture of the system.

In some embodiments, step 204 may comprise performing one or more vulnerability scans, log analysis, and/or penetration tests to detect potential weaknesses in the system. In some examples, the results of such scans may be compared to the compliance requirements or patterns determined from the target security standard, and the comparison may be used to determine the one or more deviations therefrom.

In other examples, deviations may be identified using machine learning. For example, a third model trained using a third machine learning process may be used to perform step 204. For example, a third machine learning model may be trained to take as input the security posture and the target security standard, and output how the security posture deviates from the indicated target security standard.

In some embodiments, an anomaly detection model, such as an isolation forest, one-class SVM model, or an Autoencoder may be used in step 204 (see the open-source libraries cited above for suitable models). As an example, techniques such as Isolation Forest, One-Class SVM, or Autoencoders can be used for anomaly detection in the behavior of WPP Assets, enabling the system to identify non-compliant activities.

In some examples, One-Class SVMs are used. One class SVMs may be advantageous where there are "tiers" of security levels, which may be used to determine the optimal implementation at each level depending on the relationships between the devices. For example, it may not be possible to secure a device because another depends on it and uses an insecure protocol (e.g. if it is an older version).

Turning to step 206, the method 200 then comprises iii) using a second model trained using a second machine learning process to recommend an action to perform on the system to move the security posture of the system toward the determined target security standard.

It will be appreciated that a wide range of actions may be performed or suggested by the second model. Examples of actions that may be recommended in step 206 include but are not limited to: sending an instruction to apply one or more security controls to the device. Examples of security controls include but are not limited to: configuring a firewall, updating a software patch, disabling a service, disabling a port, enforcing or changing an access control on the system, isolating a sub-component of the system, escalating an alert to a central management system, adjusting a system configuration and/or any other type of security control.

The second machine learning model may be, for example, a reinforcement learning model. The skilled person will be familiar with reinforcement learning models whereby a reinforcement learning agent is able to select an action to perform from a plurality of actions. The reinforcement learning agent takes state information from the environment, performs an action on the environment, and receives feedback on the effect of the action in the form of a reward. The reinforcement learning agent then selects another action to perform, based on updated state information. The reward is issued according to a reward function that sets out the different possible outcomes of an action, and the desirability thereof. The reinforcement learning agent learns to take actions that maximise positive rewards.

There are a wide range of different reinforcement learning agents that may be suitable for use in the embodiments herein, for example, Q-Learning or Deep Q-Networks (DQN). Deep Q-Networks are described in the paper "Deep Reinforcement Learning: A Brief Survey" by Arulkumaran et al. IEEE Signal Processing Magazine (Volume: 34, Issue: 6, November 2017).

The TensorFlow open-source code library (full citation above) has a "TF Agents" code base that may be used to create a suitable reinforcement learning framework for step 206 herein. Note that this is merely one open-source code library, and there are many other freely available code-bases that could equally be used. The adaptive and self-learning nature of reinforcement learning models such as Deep Q-Networks (DQN) can be used to train the system to make optimal decisions in response to compliance issues.

Steps ii) and iii) may be repeated in an iterative manner to sequentially recommend a plurality of actions to perform on the system to move the security posture of the system toward to the determined target security standard. Aside from the advantages of reinforcement learning being adaptive and self-learning, the use of reinforcement learning herein can be used to incrementally update the renewable energy device system in an iterative manner. Security, safety and stability checks can be performed following each action that is applied to the system, to ensure that each individual change is suitable for the high stability and criticality requirements of renewable energy systems.

As such, in embodiments where steps ii) and iii) are performed iteratively, in each iteration, an instruction may be sent to an agent on the device to cause the agent to implement a respective recommended action (recommended by the RL system). After the recommended action has been performed, an updated security posture may be determined (e.g. calculated or obtained, e.g. using the same methods as described above). The recommended action may then be evaluated in view of the updated security posture and the target security standard.

A reinforcement model may generally be set up so as encourage the agent to take actions that move the security posture toward the target security standard and to discourage actions that move the security posture away from the target security standard. As such, a reward function (e.g. reward schema) may be defined that gives a positive reward (e.g. positive "reward points") for recommendations made by the reinforcement learning model that move the security posture toward the target security standard. A positive reward may also be given based on other criteria, for example, actions that result in increased availability, reliability, and/or safety of operations of the renewable energy device system. Conversely, the reward function may be defined to give a negative reward (e.g. negative "reward points") for recommendations made by the reinforcement learning model that move the security posture away from the target security standard (e.g. that result in lower security levels or less security hardening). A negative reward may also be given based on other criteria, for example, actions that result in decreased availability, reliability, and/or safety of operations of the renewable energy device system.

An example reward function is as follows:
+10 points: action moves security posture toward target security standard.
+10 points: action results in no change in availability, reliability, and/or safety of operations of the renewable energy device system.
+15 points: action results in improved availability, reliability, and/or safety of operations of the renewable energy device system.
−50 points: action results in loss of power, system crash or other loss of function.

It will be appreciated that the reward function above is merely provided for illustrative purposes and that reward functions may be designed in other ways to that above, with more categories of reward and/or with more nuanced reward criteria.

Furthermore, it will be appreciated that other mechanisms may be used in step 206 in order to predict or determine appropriate actions to perform to move the security posture toward the target security standard. For example, decision trees and/or if then-statements may be coded to determine appropriate actions to perform.

Further steps may be performed in addition to those described above. For example, a report may be output following one or more iterations of the method 200. Such reports may describe the security posture of the system (before and/or after the method 200 having been performed), the hardware and/or software configuration of the system, one or more vulnerabilities detected in the system, one or more security controls applied to the device as a result of the recommendation output in step 206, one or more further recommendations for further hardening; and/or a compliance score indicating the security posture of the system. It will be appreciated that such reports may comprise other information to that listed above. For example, any other information obtained, determined or output in any of the steps of the method 200 described above.

It will be appreciated that the methods herein provide a fully automatable system for security hardening of a renewable energy device, such as that in a WPPs, in a manner that can result in increased stability and availability of critical infrastructure systems.

Figure 3:
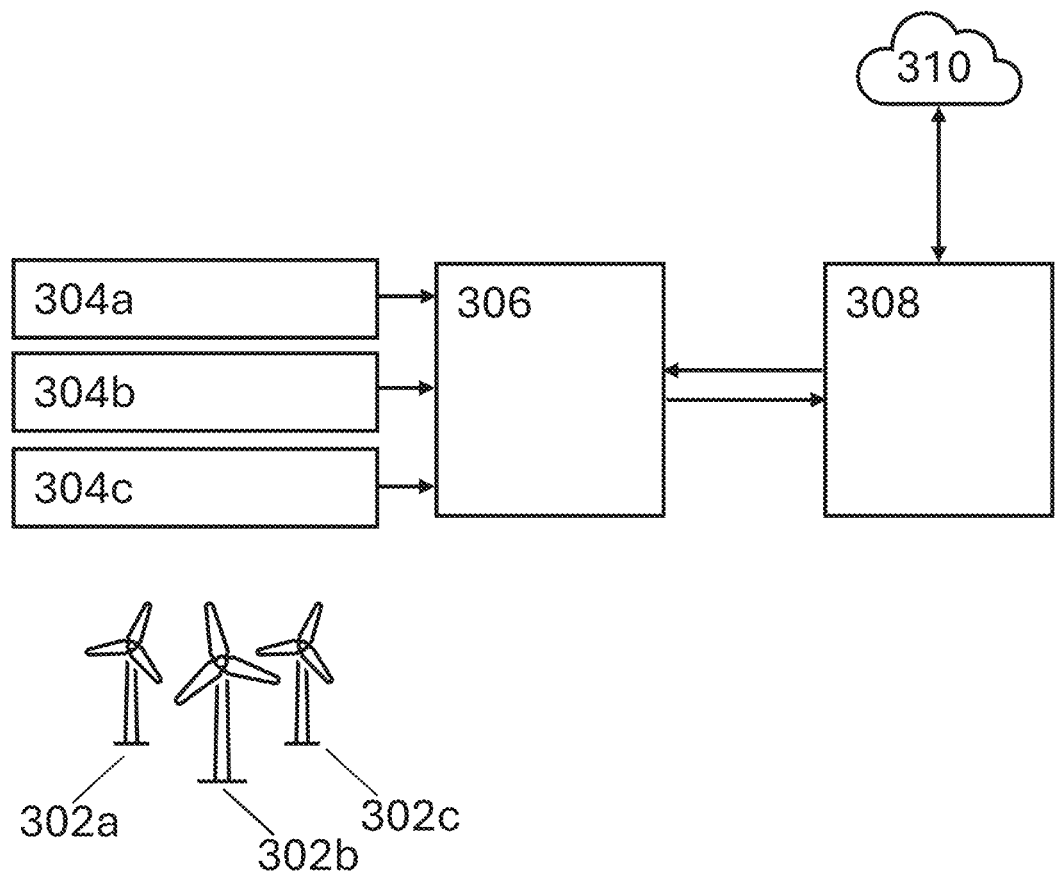
FIG. 3 shows an example WPPs according to some embodiments herein.

Turning now to an example embodiment, FIG. 3 shows an example configuration of a WPP according to an embodiment herein. The system comprises a plurality of wind turbines 302a; 302b; 302c, having associated OT 304a; 304b; 304c. OT 304a; 304b; 304c is in communication with agent 306 which in turn is in communication with a centralised controller 308. In FIG. 3, the OT systems comprise target systems that implement security controls. The controller 308 is in communication with external systems which may be hosted in or otherwise accessible from, the cloud 310.

The agent 306 scans the target systems (OT systems 304a; 304b; 304c) and extracts a set of parameters that define the security level (e.g. security posture as described above) of the target systems. The set of parameters can be extracted by analysing the configurations, access controls, encryption mechanisms, and other relevant security parameters of the systems. The agent 306 is also the actor responsible for applying the security controls determined by the controller.

The controller 308 performs the method 200 described above and uses automated mechanisms to identify specific and updated security controls for the target systems. The controller 308 is therefore in communication with a plurality of guideline providers which provide industry-standard guidelines, such as ISO 27001, NIST SP 800-53, and CIS Benchmarks. The controller 308 collects information about the industry-standard guidelines and communicates them to the agent 306 to set or update the required state of the security controls of the target systems.

The controller 308 analyzes the target system profile utilizing an AI and machine learning module, configured to learn from previous scans and security controls applied to similar devices, and to improve the accuracy and efficiency of future scans and controls. The system selects the best benchmark/guideline to be the security baseline (e.g. the target security guideline). The selection may be performed according to step 202 of the method 200 described above.

On updating the required state of the security controls in the agent 306, the agent 306 compares the extracted parameters against the industry-standard guidelines to determine the level of adherence to current security requirements. In addition, the agent 306 identifies vulnerabilities and discrepancies in the security configurations of the target systems. The agent 306 performs vulnerability scans, analyses logs, and conducts penetration testing to detect potential weaknesses or loopholes.

Once the discrepancies between the target systems' security levels and the security levels as set out in current guidelines are determined, the agent 306 applies the necessary security controls received from the controller 308. Additionally, upon identifying vulnerabilities and discrepancies, the agent 306 automatically applies remediation actions to ensure the proper compliance. The remediation actions include any of configuring firewall rules, updating software patches, disabling unnecessary services and ports, or enforcing access controls.

Additionally, the controller 308 receives analysing reports from local agents, to maintain a complete view of the state of the end systems in relation compliance. Managing the life cycle of security controls that must be applied to end systems.

The agent 306 may further produce a compliance report including information such as the discrepancies between the security levels of the target systems and the security levels demanded by current industry-standard guidelines. The compliance report can comprise a compliance score that reflects the level of security compliance achieved by the target systems. The compliance score can further indicate the gap that the target systems had prior to the remediation actions. The compliance report could also provide an overview of the hardware and software configuration, identified vulnerabilities, and security controls applied to the target systems. The compliance report may further comprise: a summary of the security posture of the target device by providing an overview of its hardware and software configuration, vulnerabilities found, security controls applied, and recommendations for further hardening in case the device has special functionality that is not compatible with the security control presented.

Example AI Techniques for Use in the Controller 308

The use of AI techniques for WPP Assets can bring benefits, such as:

Complex Pattern Recognition: AI techniques can be utilized for the system to recognize complex patterns and anomalies in the behavior of ICS, IT, network devices, and software, thus enhancing the detection of security compliance issues.

Adaptability and Learning: AI models can adapt to new security threats and learn from historical data, enabling the system to continuously improve its ability to identify and address compliance issues.

Automation of Remediation: By using AI, the system can automate the process of identifying and applying remediation actions, thus reducing manual intervention and response time.

Scalability: AI techniques can help in scaling the system to handle large and diverse sets of WPP Assets, ensuring comprehensive security compliance coverage.

Improved Efficiency: Enables faster detection and response to security incidents, minimizing potential damage.

Continuous Monitoring: Provides real-time insights into security posture and identifies compliance gaps.

Various models can be used to achieve the advantages described above:

Anomaly Detection Models: Techniques such as Isolation Forest, One-Class SVM, or Autoencoders can be used for anomaly detection in the behavior of WPP Assets, enabling the system to identify non-compliant activities.

Natural Language Processing (NLP) Models: NLP models like BERT or GPT-3 can be employed for processing textual guidelines and reports, enabling the system to understand and act upon compliance requirements and findings.

Reinforcement Learning: For adaptive and self-improving capabilities, reinforcement learning models such as Deep Q-Networks (DQN) can be used to train the system to make optimal decisions in response to compliance issues.

Training Model Approach and Example of Inputs Outputs of the Model

To train these models, historical data related to security compliance incidents, system behaviors, and remediation actions can be used. The inputs for training could comprise:
Historical security compliance data
Guidelines and policies
Design and configuration documentation
System behavior logs
Previous remediation actions and their outcomes
The Outputs of the Trained Models could Include:
Identification of anomalous behavior or non-compliance
Recommended remediation actions
Prioritization of compliance issues
Continuous improvement in the system's ability to identify and address security compliance concerns.

It will be appreciated by the skilled person that the selection and training of AI the models will generally be tailored to the specific requirements and characteristics of WPP Assets and the desired behaviour of the security system (e.g. agent 306 and controller 308).

Further Example Implementation: Industrial PC (IPC) as Target System

Receiving Guidelines and Data:
The controller 308, acting as a centrally managed agent, receives security compliance guidelines, historical data, and system behavior logs from the central management system or security operations center.
AI-Enhanced Data Processing:
The system utilizes AI models, such as natural language processing (NLP) algorithms, to process textual guidelines and reports, extracting key compliance requirements and patterns from the received data of Industrial PC.
Compliance Checking and Reporting:
AI models for anomaly detection, such as Isolation Forest or Autoencoders, are employed to analyze Industrial PC system behavior logs and identify potential security compliance deviations based on the received guidelines.
The controller 308 autonomously triggers compliance checking, compares Industrial PC system behavior against compliance requirements, and generates compliance reports based on the AI-analyzed data.
Remediation Actions and Decision-Making:
If necessary, the system, guided by AI models, recommends, and applies remediation actions, such as isolating affected sub-components of industrial PC, adjusting system configurations, or escalating alerts to the central management system for further action.
Continuous Learning and Improvement:
The AI-enhanced controller 308 incorporates feedback from the outcomes of its decisions and actions to continuously improve its compliance checking and remediation capabilities.
Training data, including historical security compliance incidents, system behaviors, and remediation actions, is used to update and retrain the AI models within the Controller 308, ensuring adaptability and learning.
In this way, the system (e.g. the agent 306 and controller 308) may be considered an Autonomous Security Compliance system which can be run on WPP Assets (ICS, IT, network devices, WPP software and WPP backend applications) as a centrally managed agent to receive necessary guidelines, trigger compliance checking for the WPP target system, provide system compliance reporting, and apply remediation actions as needed.

In an example embodiment,

Turning now to other embodiments, it will be appreciated that the method 200 may be embodied in a computer program. For example, a computer program product may comprise a computer readable medium, the computer readable medium having computer readable code embodied thereon. The computer readable code can be configured such that, on execution by a suitable computer or processor, the computer or processor is caused to perform the method or methods described herein (such as the method 200).

A computer program may take different forms, for example, source code, compiled code, executable code, or any other type of code. It will be appreciated that the source code of computer programs may be written in a wide variety of different programming languages, and may take different architectural designs. For example, the functionality described herein may be split across various different sub-routines. Furthermore, the skilled person will appreciate that many different ways of splitting the functionality between the different sub-routines will be possible. The sub-routines may be stored together in one executable file to form a self-contained program. Furthermore, computer programs may call external and/or standard libraries of computer code for performing certain sub-tasks associated with the functionality described herein.

In another embodiment, there is a computer program product comprising non-transitory computer readable media, having stored thereon a computer program as described above. Examples of computer readable media include, but are not limited to: ROM, such as a CD ROM, a semi-conductor ROM or a magnetic recording medium such as a hard disk.

In another embodiment, there is a carrier containing a computer program. Examples of carriers include but are not limited to an electronic signal, optical signal, radio signal, computer storage medium, or similar. The carrier of a computer program may be any entity or device (e.g. hardware) capable of carrying the program. As an example, a carrier may be a computer readable media as described above. In other examples a carrier may be a transmissible carrier such as an electronic or optical signal, which may be conveyed via electrical or optical cable or by radio or other means.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these claims cannot be used to advantage. Any reference signs in the claims should not be construed as limiting the scope.

The invention claimed is:
1. A computer implemented method for security hardening of a renewable energy device system, the method comprising:
i) determining a target security standard for the renewable energy device system using a first model trained using a first machine learning process that predicts the target security standard from a security posture of the renewable energy device system;

ii) identifying one or more deviations in the security posture of the renewable energy device system from the target security standard; and iii) using a second model trained using a second machine learning process to recommend, based on the one or more deviations identified, an action to perform on the renewable energy device system to move the security posture of the renewable energy device system toward the determined target security standard, and repeating ii) and iii) in an iterative manner to sequentially recommend a plurality of actions to perform on the renewable energy device system to move the security posture of the renewable energy device system toward the determined target security standard.

2. The method of claim 1 further comprising:

in each iteration, sending an instruction to an agent on the renewable energy device system to cause the agent to implement the respective recommended action;

determining an updated security posture following the recommended action having been performed; and evaluating the respective recommended action in view of the updated security posture, and the target security standard.

3. The method of claim 1 wherein the second model is a reinforcement learning model and wherein a reward function of the reinforcement learning model gives:

a positive reward for recommendations made by the reinforcement learning model that move the security posture toward the target security standard and/or that result in increased availability, reliability, and/or safety of operations of the renewable energy device system; and a negative reward for recommendations made by the reinforcement learning model that move the security posture away from the target security standard and/or result in decreased availability, reliability, and/or safety of operations of the renewable energy device system.

4. The method of claim 1 wherein the determined target security standard is selected from a plurality of candidate security standards and either:

most closely matches the security posture of the renewable energy device system; or represents an upgrade to a most closely matching security standard to the security posture of the renewable energy device system.

5. The method of claim 1 wherein the recommended action comprises an instruction to apply one or more security controls to the renewable energy device system, wherein the security controls relate to: configuring a firewall, updating a software patch, disabling a service, disabling a port, enforcing or changing an access control on the renewable energy device system, isolating a sub-component of the renewable energy device system, escalating an alert to a central management system or adjusting a system configuration.

6. The method of claim 1 further comprising: determining the security posture for the renewable energy device system from a hardware and/or software configuration of the renewable energy device system.

7. The method of claim 6 further comprising:

receiving one or more device profiles for the renewable energy device system from an agent on the renewable energy device system;

receiving one or more behaviour logs for the renewable energy device system from the agent on the renewable energy device system;

processing the device profiles and system behaviour logs using natural language processing; and determining the security posture from the processed device profiles and processed system behaviour logs.

8. The method of claim 1 wherein identifying the one or more deviations comprises using natural language processing to convert the target security standard into one or more compliance requirements or patterns that can be compared to the security posture of the renewable energy device system.

9. The method of claim 1 wherein identifying the one or more deviations is performed by performing one or more: vulnerability scans, log analysis, and/or penetration tests to detect potential weaknesses in the renewable energy device system.

10. The method of claim 1 wherein identifying the one or more deviations is performed using a third model trained using a third machine learning process, and wherein the third model is an anomaly detection model.

11. The method of claim 1 further comprising outputting a report, the report comprising:

the security posture of the renewable energy device system;

a hardware and/or software configuration of the renewable energy device system;

one or more vulnerabilities detected in the renewable energy device system;

one or more security controls applied to the renewable energy device system as a result of the recommendation;

one or more further recommendations for further hardening; and/or a compliance score indicating the security posture of the renewable energy device system.

12. The method of claim 1 wherein the renewable energy device system is a Wind Power Plant Device.

13. A computer node for security hardening of a renewable energy device system, the computer node comprising:

a memory comprising instruction data representing a set of instructions; and a processor configured to communicate with the memory and to execute the set of instructions, wherein the set of instructions, when executed by the processor, cause the processor to:

i) determine a target security standard for the renewable energy device system using a first model trained using a first machine learning process that predicts the target security standard from a security posture of the renewable energy device system;

ii) identify one or more deviations in the security posture of the renewable energy device system from the target security standard by using natural language processing to convert the target security standard into one or more compliance requirements or patterns that can be compared to the security posture of the renewable energy device system; and iii) use a second model trained using a second machine learning process to recommend, based on the one or more deviations identified, an action to perform on the renewable energy device system to move the security posture of the renewable energy device system toward the determined target security standard.

14. The computer node of claim 13, wherein the processor is further caused to:

repeat ii) and iii) in an iterative manner to sequentially recommend a plurality of actions to perform on the renewable energy device system to move the security posture of the renewable energy device system toward the determined target security standard.

15. A computer program product comprising a non-transitory computer readable medium storing instructions which, when executed on at least one processor, cause the at least one processor to carry out an operation, comprising:
i) determining a target security standard for a renewable energy device system using a first model trained using a first machine learning process that predicts the target security standard from a security posture of the system, wherein the security posture of the system is determined by:
receiving one or more device profiles for the renewable energy device from an agent on the device;
receiving one or more behaviour logs for the renewable energy device system from the agent on the device;
processing the device profiles and system behaviour logs using natural language processing; and
determining the security posture from the processed device profiles and processed system behaviour logs;
ii) identifying one or more deviations in the security posture of the system from the target security standard; and
iii) using a second model trained using a second machine learning process to recommend, based on the one or more deviations identified, an action to perform on the system to move the security posture of the system toward the determined target security standard.

16. The computer program product of claim 15, wherein the operation further comprises:
determining the security posture for the renewable energy device system from a hardware and/or software configuration of the renewable energy device system.

17. The computer program product of claim 15, wherein the operation further comprises:
repeating ii) and iii) in an iterative manner to sequentially recommend a plurality of actions to perform on the renewable energy device system to move the security posture of the renewable energy device system toward the determined target security standard.

18. The computer program product of claim 15, wherein identifying the one or more deviations comprises using natural language processing to convert the target security standard into one or more compliance requirements or patterns that can be compared to the security posture of the renewable energy device system.

\* \* \* \* \*